(12) United States Patent
Weirich

(10) Patent No.: US 11,560,088 B2
(45) Date of Patent: Jan. 24, 2023

(54) WHEEL OR TIRE WITH ILLUMINABLE FEATURE

(71) Applicant: Matthew David Weirich, Cincinnati, OH (US)

(72) Inventor: Matthew David Weirich, Cincinnati, OH (US)

( * ) Notice: Subject to any disclaimer, the term of this patent is extended or adjusted under 35 U.S.C. 154(b) by 379 days.

(21) Appl. No.: 16/809,475

(22) Filed: Mar. 4, 2020

(65) Prior Publication Data

US 2020/0198531 A1 Jun. 25, 2020

(51) Int. Cl.
*B60C 19/00* (2006.01)
*B60C 11/24* (2006.01)
*B60Q 1/32* (2006.01)
*B60B 21/02* (2006.01)

(52) U.S. Cl.
CPC .............. *B60Q 1/326* (2013.01); *B60B 21/02* (2013.01); *B60C 11/24* (2013.01); *B60C 19/00* (2013.01); *B60C 2019/006* (2013.01)

(58) Field of Classification Search
CPC .............. B60C 19/00; B60C 2019/006; B60C 2019/007; B60C 11/24; B60C 11/243; B60C 11/246
See application file for complete search history.

(56) References Cited

U.S. PATENT DOCUMENTS

2008/0105345 A1\* 5/2008 Fenkanyn ............. B60C 13/001
152/152.1

FOREIGN PATENT DOCUMENTS

DE 10208998 \* 9/2003
EP 1543999 \* 6/2005

OTHER PUBLICATIONS

Machine translation of DE 10208998, 2003.\*

\* cited by examiner

*Primary Examiner* — Justin R Fischer
(74) *Attorney, Agent, or Firm* — David M. Weirich

(57) ABSTRACT

Tire or wheel for use on a vehicle, machine, equipment, toy or the like. The tire or wheel has an illuminable feature including at least one optical fiber.

19 Claims, 4 Drawing Sheets

WHEEL OR TIRE WITH ILLUMINABLE FEATURE

FIELD OF THE INVENTION

The present invention relates to tires and/or wheels with one or more illuminable features. More specifically, the present invention relates to tires and/or wheels including illuminable LED lights and/or optical fibers.

BACKGROUND OF THE INVENTION

Tires and wheels are well known and widely used for many different purposes, including use on or with motorized and non-motorized vehicles, equipment, machinery, tools, toys, etc. Historically, tires and wheels have lacked certain functionality and aesthetic features, typically due to the materials making up the wheels and tires, but also due to the purposes for which the wheels and/or tires are intended to be used. However, it has been discovered that with the improvements in materials, electronics and light sources, it is now possible to provide tires and wheels with previously unavailable and unrecognized aesthetic and functional benefits. For example, it has been discovered that illuminable features, such as lighting elements, can be incorporated into tires and wheels. Such illuminable features can be used to provide improved aesthetics (e.g. visual patterns or characters created by the illumination feature), functional purposes (e.g. to help light an area, to indicate wear, to show movement, to identify characteristics of the wheel or tire, to indicate the need for service, to make the wheel or tire more visible and/or to provide other functional benefits), or for both functional and aesthetic purposes.

As such, it would be desirable to provide a tire with an illuminable feature. It would also be desirable to provide a tire including one or more LED light sources. It would also be desirable to provide a tire including one or more optical fibers.

It would also be desirable to provide a wheel with an illuminable feature. Further, it would be desirable to provide a wheel including one or more LED light sources. It would also be desirable to provide a wheel including one or more optical fibers.

The invention disclosed herein may provide any one or more of the described or other features and/or benefits and such features and/or benefits may be provided separately or in any desired combination.

SUMMARY OF THE INVENTION

The present invention provides a solution for one or more of the deficiencies of the prior art as well as other benefits. Specifically, the present invention provides a tire for use on a vehicle, the tire having an illuminable feature and comprising: two sidewalls, each sidewall having a proximal end, a distal end, an inner surface and an outer surface; a shoulder region adjacent the distal end of each sidewall; a contact region disposed between the shoulder regions; and an illuminable feature, the illuminable feature including at least one optical fiber.

The present invention also provides a wheel for use on a vehicle, the wheel having an illuminable feature and comprising: a central hub; a support structure extending radially outwardly from the central hub to a circular rim, the rim having two outwardly extending walls, an inner wall and an outer wall separated by a rim central region; and an illuminable feature, the illuminable feature including at least one optical fiber.

DETAILED DESCRIPTION OF THE INVENTION

Figure 1:
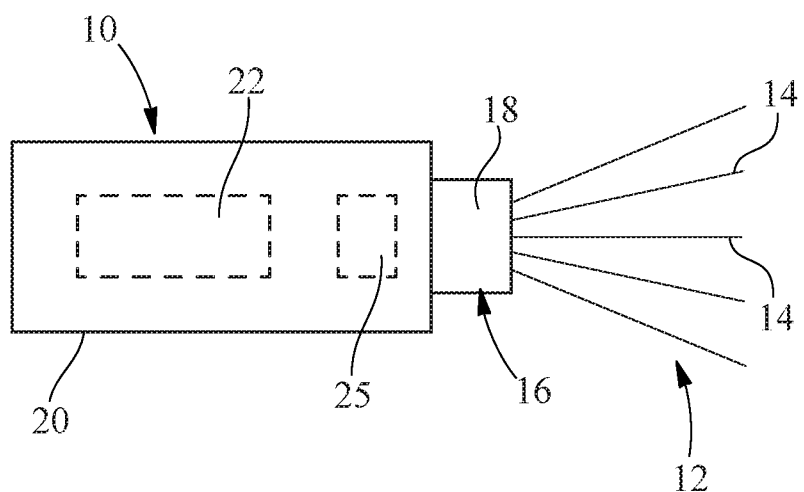
FIG. 1 is a simplified plan view of a lighting system.

As noted herein, the present invention is directed to an illuminable feature (or illumination feature), that is or can be incorporated into a wheel or tire. The illumination feature can provide one or more aesthetic and/or functional benefits, some of which are described in more detail below. However, it should be understood that additional aesthetic and functional benefits are contemplated, and the disclosure should not be interpreted as limiting the invention to only those embodiments that are described. Also, it should be understood that the individual elements described with respect to any particular embodiment are not intended to be limited to that particular embodiment and should be considered fully disclosed with respect to other embodiments of the invention that are described herein as well as any others that are obvious variations thereof. In addition, all elements disclosed herein should be considered disclosed in any combination with any other elements and features described herein as well as obvious variations.

Definitions

The terms "optical fiber" and "fiber optic" as used herein refers to a filament made of glass or plastic that is capable of transmitting light along its length. Optical fibers can be used individually or in bundles such as cables. Suitable optical fibers include, but are not limited to single mode or multimode and can have any desired thickness and length.

The term "tire" as used herein refers to a ring or band of material, either solid or inflated, generally used in conjunction with a wheel or other rotating structure, to provide traction, resistance to wear, or other desirable properties to the rotating structure.

The term "wheel" as used herein is a circular object that generally revolves on an axle. Wheels are often used on vehicles to allow for easy movement over a surface and in machinery, equipment, toys and other devices to allow for rotational movement of an element. Wheels are often designed to be at least partially surrounded by a tire which is intended to contact a surface adjacent the wheel.

As noted herein, the present invention is directed generally to wheels and tires that include one or more illuminable features. The illuminable features preferably include at least one optical fiber capable of transmitting light through its length. The illuminable feature may also include one or more a light sources that are operatively associated with the one or more optical fibers. The light source can be configured to introduce light to one end of the optical fiber such that the light is transmitted through the length of the optical fiber.

The wheels and tires of the present invention, or combinations thereof, can be used to provide aesthetic and functional features. For example, the illuminable feature can provide the wheel and/or tire with aesthetic features such as portions that are lit up. In one example the lit up portion can provide purely decoration, such as lit up patterns on the tire and/or wheel. The lit up portions can be random or can be in a predetermined pattern such as a graphic, etc. The lit up portion can also provide an aesthetic feature like a lit up sidewall or portion thereof, lit up treads or lit up spokes of a wheel. Of course, these are merely examples of the possible aesthetic uses for the present invention and they should not be considered limiting in any way.

From a functional standpoint, the present invention can be used to provide many desired characteristics for a wheel or tire. For example, the illuminable feature can be used to show wear on a tire, as a tire pressure indicator, to indicate the need for tire rotation and/or replacement, to help illuminate the road or other surface adjacent the tire or wheel, to help signal others of the location of a vehicle, tire or wheel, to indicate rotation or speed of rotation, and even to help identify the size, make, model or other information relevant to the tire or wheel. In one example the color of the illuminable feature changes as the speed of the wheel increases or decreases. In another example, the illuminable feature turns off once the wheel or tire reaches a certain rotational speed.

Of course, the particular type of light source is not limited, but can be chosen based on the particular desired use. In one example, a LED light source is used. LED lights can be used in conjunction with the optical fibers and/or separately to provide the desired features of the present invention. LED lights are particularly desirable because they are very energy efficient and can provide a range of colors and intensities.

One or more light sources can be used and the light sources can provide the same or different colors, intensity or duration of the light signal. Thus, the illuminable feature can provide a wide variety of aesthetic and functional benefits, including one or more colors, changing colors, changing intensity, flashing, dimming, etc.

The one or more light sources can be operatively associated with a controller. The controller can be used to control one or more aspects of the light source, including turning it on and off, changing the color, changing the intensity of the light, changing the duration of the light, flashing the light, timing the light, or any other desired characteristic. The controller can be joined to the light source or can be separate therefrom. If separate therefrom, the controller can be wirelessly connected to the light source via radio waves such as WiFi, IEEE 802.11, Bluetooth, etc.; light, or any other wireless transmitting medium. The controller can be a stand-alone apparatus or can be part of another structure or apparatus like a smart phone, a radio, a remote control, or other structure or apparatus.

Any portion or element of the illuminable feature can be integral with, joined to or separate from the tire or wheel with which it is operatively associated. For example, a tire of the present invention may have one or more optical fibers integrally formed into the tire, but the light source is separately formed and joined to the tire and the controller may be un-joined and separate from the tire and other parts of the illuminable feature. In other embodiments, the illuminable feature may be partly joined to or incorporated into both a wheel and tire or may be incorporated into several associated wheels and tires. For example, a single controller may control several light sources located in different wheels and/or tires, or may control a single light source that is able to illuminate both a tire and a wheel, more than one tire, more than one wheel, or several tires and wheels.

FIGS. 1-6 illustrate various features of the claimed invention. The figures are not intended to be limiting in any way, but rather to provide examples of the present invention and/or different features thereof. Alternative combinations of features are contemplated as are embodiments not specifically shown in the figures.

FIG. 1 is a simplified plan view of an example of a lighting system 10 that includes a fiber optic illuminable feature 12 of the type that can be used in the present invention. Specifically, the illuminable feature 12 includes a multiplicity of optical fibers 14. However, as noted herein, the illuminable feature 12 may include a single optical fiber 14 or any number of optical fibers 14 or other illuminable features 12. One alternative illuminable feature 12 is an LED light. The lighting system 10 also includes a light source 16 operatively connected to one or more of the optical fibers 14. Any number of light sources 16 can be used and such light sources 16 can be operatively connected to one or more optical fibers 14 or other illuminable features 12. The light source 16 can be any suitable source of light, including lamps, LED lights, and the like. In the embodiment shown, an LED light 18 is used to provide light to the optical fibers 14. The light source 16 may be chosen or configured to provide one or more different colors of light, have a single or multiple intensities, be able to flash, dim, fade or otherwise change as desired.

The lighting system 10 may include a power source 20 such as one or more batteries 22, or may connectible to a source of power such as an external battery 22 or an alternative power source 20 like a power generator. Power generators can be of any type, and include, but are not limited to solar, wind, rotational, friction, heat, etc. One type of generator creates power based on the rotation of certain engine parts of the vehicle or machine. Another uses rotation of the wheel and/or tire to provide rotational energy that is converted into power to run the lighting system 10.

Figure 1A:
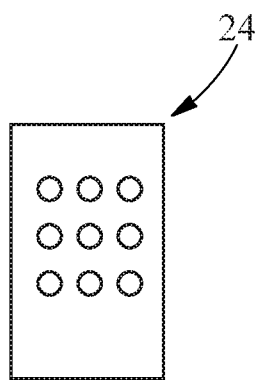
FIG. 1A is a plan view of a controller in accordance with the present invention.

The lighting system 10 may also include a controller 24, an example of which is shown in FIG. 1A. The controller 24 can be integral with one or more other elements of the lighting system or can be separate therefrom. If separate therefrom, the controller 24 can be connected by wires or may be wirelessly connected to the lighting system 10. The controller 24 can be a separate device such as a handheld remote control or can be integrated into another device or feature. For example, the controller 24 can be an app for a smart phone or can be integrated into another device such as a radio, steering wheel or other control panel. The controller 24 can be configured to interact with the lighting system 10. For example, it can be used to turn on and off the lighting system 10, to change the color of the light, to change the intensity of the light, to make the light flash or fade in and out, or to provide any other desired aesthetic or functional feature.

In exemplary embodiments, the controller 24 may obtain input from one or more sources and then control the lighting system in accordance with pre-programmed instructions. For example, the controller 24 may receive input from a vehicle's computer and use that information to control the lighting system. Non-limiting examples include flashing to the beat of music, changing color depending on the speed of the vehicle, flashing or turning on when a user unlocks the doors of the vehicle, and flashing in response to a panic button being pressed. The light source 16 may include a receiver 26 to receive the signal of the controller 24.

The lighting system 10 can also include a microprocessor 25 to process information and/or signals it receives from one or more input devices. For example, the microprocessor 25 could receive input from an accelerometer, a microphone, a WiFi receiving device, a timer, or other devices. The microprocessor 25 can be pre-programmed or can be programmed by the user.

Figure 2:
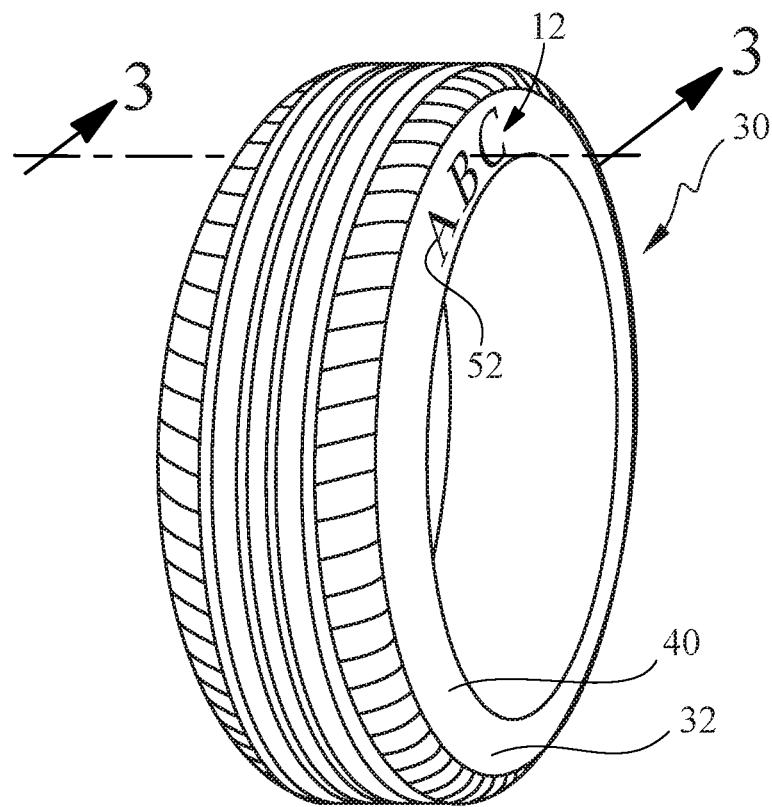
FIG. 2 is perspective view of a tire in accordance with the present invention.
Figure 3:
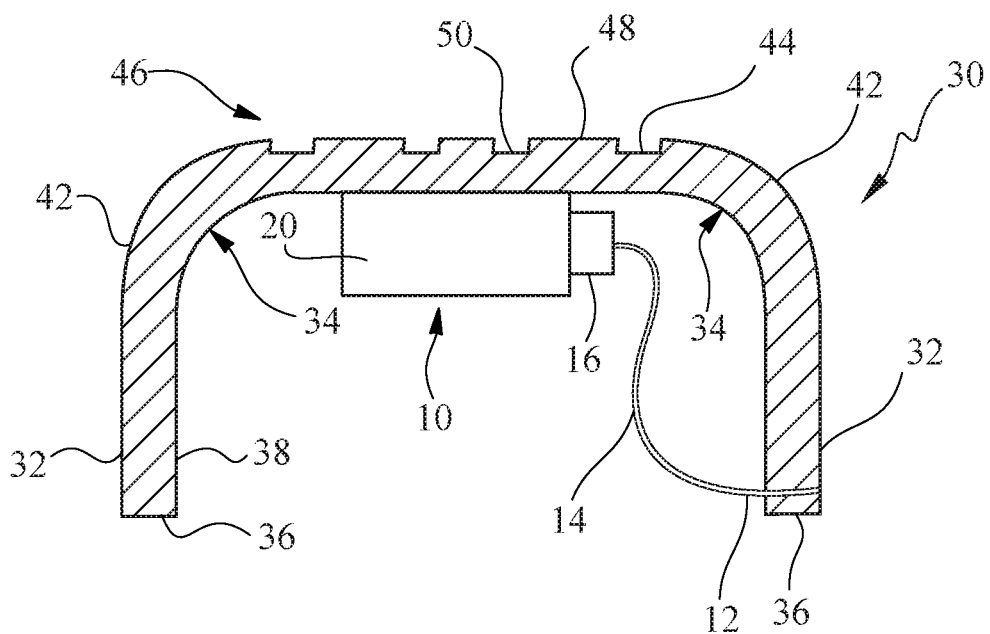
FIG. 3 is cross-section of the tire of FIG. 2 taken through 3-3.

FIG. 2 is perspective view of a tire 30 including features of the present invention. A cross-section of the tire 30 of FIG. 2 taken through section line 3-3 is shown in FIG. 3. The tire 30 shown in FIG. 2 includes illuminable feature 12. As shown, the illuminable feature 12 is visible on the outer surface 40 of the sidewall 32 of tire 30. In the embodiment shown, the illuminable feature is in the form of one or more indicia 52, such as, for example letters. However, the indicia 52 may also be numbers, symbols, graphics, lines, curves, points, patterns, logos, or any other desired aesthetic or functional feature. One example is a ring such as the white ring of a whitewall on an automobile tire. Another example is the lettering of white letter tires. Yet another example is an illuminable display disposed on the outer surface 40 of the tire 30 that can be illuminated by letters, numbers, graphics, etc. Such a display may have a predefined visual output or may be programmable and/or changeable by the user. The illuminable feature 12 shown in FIG. 2 includes an optical fiber 14, but other illuminable features 12 are contemplated.

As shown in FIG. 3, the tire 30 includes two sidewalls 32 each having a proximal end 34 and a distal end 36. The tire has an inner surface 38 and an outer surface 40. The tire also includes a shoulder 42 adjacent the proximal end 34 of each sidewall 32. The shoulders 42 are separated by a contact region 44. In the embodiment shown, the tire 30 includes a tread 46 disposed on the outer surface 40 of the tire 30 in the contact region 44. The tread 46 may include one or more protuberances 48 and such protuberances 48 may be separated by valleys 50. Whether a tread 46 is used or not is optional and if a tread 46 is used, it can be of any type or pattern. The optical fiber 14 of the illuminable feature 12 is shown in FIG. 3 as passing through the sidewall 32 from the inner surface 38 to the outer surface 40. However, this is just one exemplary embodiment and others are contemplated and described herein.

Figure 4:
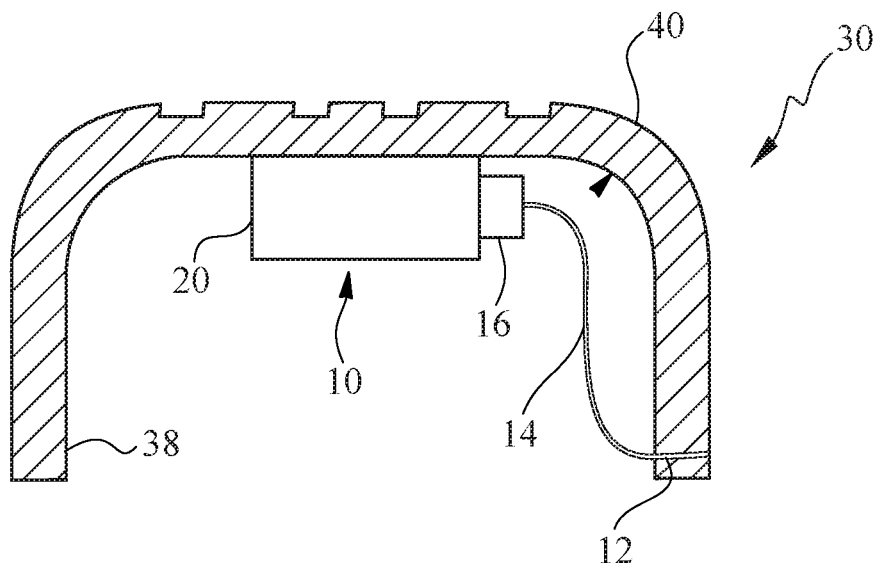
FIG. 4 is cross-section of a portion of a tire in accordance with the present invention.

FIG. 4 is a cross-sectional view of a tire 30 of the present invention including an illuminable feature 12 as part of a lighting system 10. The lighting system shown includes a light source 16 and a power source 20. The light source 16 and power source 20 are disposed on the inner surface 38 of the tire 30. However, it is contemplated that the light source 16, power source, or both could be located on the outer surface 40 of the tire, on a wheel, on a hub cap, or on any other part of the vehicle, equipment, machine etc. to which the tire 30 is fit. The entire lighting system 10 or any components thereof can be integral with the tire 30. Alternatively, any or all components of the lighting system 10 may be separate from the tire 30 and joined thereto by any suitable means. If they are joined thereto, the lighting system 10 or components thereof can be permanently joined thereto or they may be removable therefrom.

Figure 5:
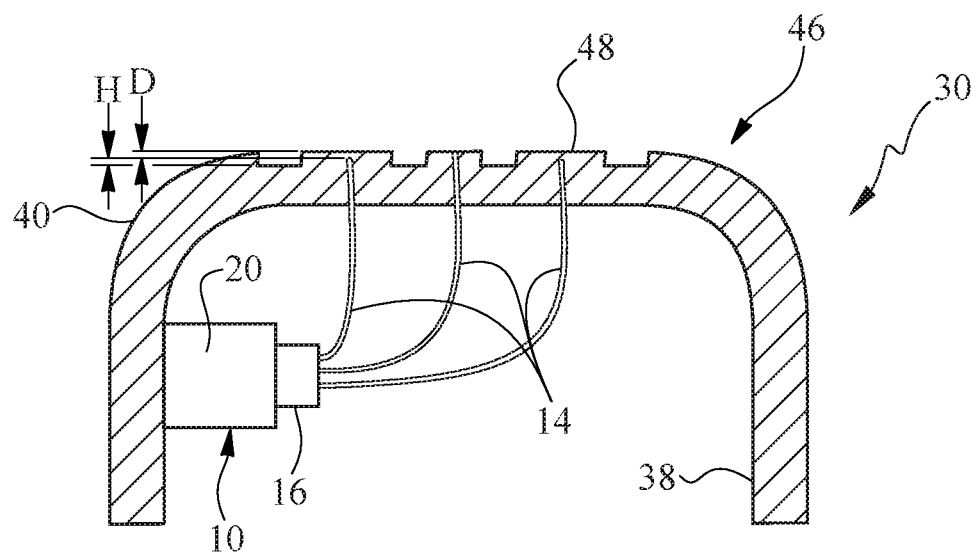
FIG. 5 is cross-section of a portion of a tire in accordance with the present invention.

FIG. 5 is a cross-section of an embodiment of the present invention in which the tire 30 includes a tread 46. The tread 46 includes a multiplicity of protuberances 48 separated by one or more valleys 50. In the embodiment shown, optical fibers 14 are located in one or more of the protuberances 48.

The optical fiber(s) may extend fully through the tire 30 from the inner surface 38 through the entirety of the protuberance 48. However, in a preferred embodiment, at least one optical fiber 14 extends only partly through the protuberance 48. For example, one or more optical fibers 14 can extend a predetermined distance through one or more protuberances 48, such as, for example, a pre-determined distance D from the outer-most surface of the protuberance 48. The fiber optic 14 could also extend a predetermined distance from the inner surface 38 of the tire 30, or extend to location a predetermined distance from any other feature of the tire 30. For example, the fiber optic 14 could extend a predetermined height H from the valley 50 of the tread 46 adjacent the protuberance 48 or from the inner surface 38 of the tire 30. As such, the optical fiber 14 can be used to show when the tread 46 of the tire 30 has worn to a predetermined height H above the adjacent valley 50 or inner surface 38. This can be useful to help a user determine when it is time to check or replace a tire due to tread wear. Such configurations can also be used to provide information about when a tire 30 should be rotated or otherwise serviced.

Figure 6:
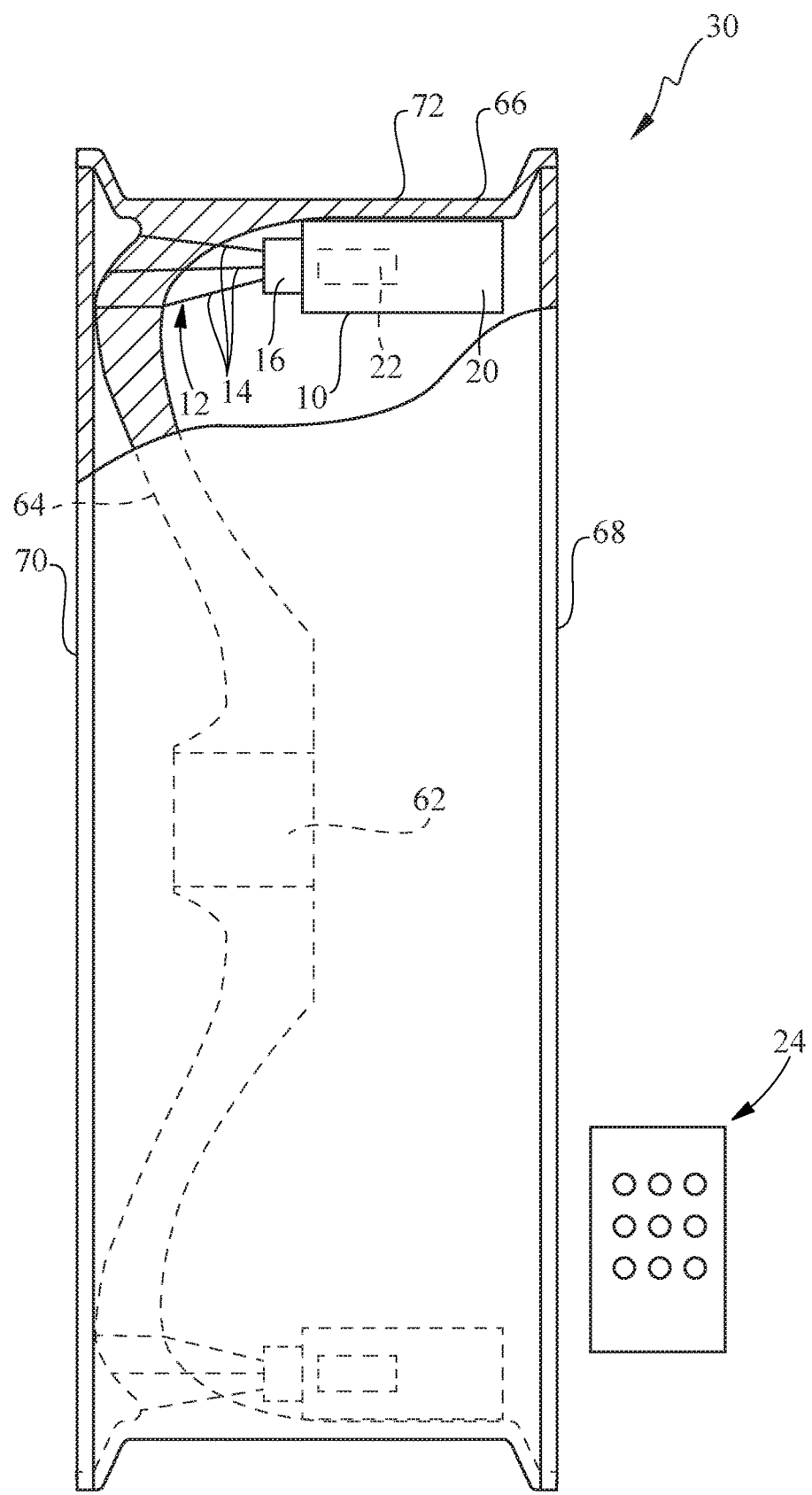
FIG. 6 is plan view of a wheel in accordance with the present invention with a partial cut-away portion.

FIG. 6 is a plan of a wheel 60 including the lighting system 10 of the present invention. As shown, the wheel 60 includes a hub 62 that can be joined to or disposed about an axle, a support structure 64 extending radially outwardly from the hub 62, and a circular rim 66. The hub 62 can be any suitable structure, including one or more openings, one or more shafts, and/or any other structure that can be used to associate the wheel 60 with vehicle, machine or equipment with which it is used. The rim 66 has two outwardly extending walls, inner wall 68 and outer wall 70, separated by a rim central region 72. The wheel 60 also includes an illuminable feature 10. The illuminable feature 12 shown includes several optical fibers 14 extending through the outer wall 70 of the wheel 60.

As noted with respect to the tire embodiments of the present invention, the wheel 60 may also include one or more components of a lighting system 10. For example, the wheel 60 may include one more light sources 16, power sources 20, and controllers 24. The different components may be integral with the wheel 60 or may be separate structures joined thereto. As shown in the figure, the power source 20 and light source 16 may be located on an inner surface of the wheel 60. However, it is also possible to locate different components of the lighting system in different locations on the wheel 60, including, the support structure 64 or any part of the rim 66, including the rim central region 72, inner wall 68, or outer wall 70. The controller 34 can be integral with any portion of the lighting system 10 or may be a separate structure that is joined to any part of the wheel 60 or tire 30 or may be a stand-alone structure that is not attached to any other structure or element.

As shown in FIG. 6, the wheel 60 includes two power sources 20 including batteries 22, however, any number of power sources and/or batteries 22 can be used. The power sources 20 are each joined to a different light source 16. Each light source 16 is operatively associated with a multiplicity of optical fibers 14. In such configurations, the light sources can be individually controlled or can be controlled by a single controller 34.

The wheel 60 shown in FIG. 6, or any alternative configuration thereof can be used with a standard tire or a tire 30 including one or more illuminable features 12. If used with a tire 30 having an illuminable feature 12, the wheel 60 and tire 30 may share a light source 16, power source 20 and/or controller 24.

All of the features of the embodiments described with respect to the wheel 60 are also contemplated for the tire embodiments and all of the features of the tire embodiments are contemplated for the wheel embodiments.

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A tire for use on a vehicle, the tire having an illuminable feature and comprising:
    two sidewalls, each sidewall having a proximal end, a distal end, an inner surface and an outer surface;
    a shoulder region adjacent the distal end of each sidewall;
    a contact region disposed between the shoulder regions;
    an illuminable feature, the illuminable feature including at least one optical fiber, a controller that allows a user to control the illuminable feature, and a receiver to receive a signal from the controller;
    a tread disposed in the contact region, the tread formed from a plurality of protuberances and adjacent valleys, wherein one or more of the at least one optical fibers extends a predetermined height above the adjacent valley into at least one protuberance such that the optical fiber is exposed prior to the protuberance being worn down to the full depth of the adjacent valley; and
    at least one light source operatively associated with at least one optical fiber such that the light source, when lit, can direct light through the operatively associated optical fiber.

2. The tire of claim 1 wherein the illuminable feature is integrally formed into at least a portion of the tire.

3. The tire of claim 1 wherein the illuminable feature includes two or more optical fibers.

4. The tire of claim 3 wherein the two or more optical fibers are operatively associated with two or more different light sources such that the different light source, when lit, can direct light through the respective operatively associated optical fibers.

5. The tire of claim 4 wherein the two or more different light sources are able to provide light of different intensity, color, and/or duration.

6. The tire of claim 1 wherein the illuminable feature includes a multiplicity of optical fibers and at least some of the optical fibers are arranged such that they create a pattern on the sidewall of the tire.

7. The tire of claim 6 wherein the pattern is selected from one or more of the following: a ring extending around at least a portion of the sidewall, a letter, a logo, a number, a graphical design, and combinations thereof.

8. The tire of claim 1 wherein the at least one optical fiber extends the predetermined height above the adjacent valley such that the optical fiber can provide information to a user about the extent of wear in the tread when the optical fiber is exposed due to the protuberance being worn down to the predetermined height above the adjacent valley.

9. The tire of claim 1, wherein the at least one optical fiber operatively associated with the light source is used to indicate when the tire should be replaced when exposed.

10. The tire of claim 1 wherein a multiplicity of optical fibers are disposed in the tread at different predetermined heights above the adjacent valley.

11. The tire of claim 1 wherein the controller receives input from a computer associated with a vehicle.

12. The tire of claim 11 wherein the controller is a wireless controller and the controller is not joined to the tire.

13. A tire for use on a vehicle, the tire having an illuminable feature and comprising:
    two sidewalls, each sidewall having a proximal end, a distal end, an inner surface and an outer surface;
    a shoulder region adjacent the distal end of each sidewall;
    a contact region disposed between the shoulder regions;
    an illuminable feature, the illuminable feature including at least one optical fiber;
    at least one light source operatively associated with the at least one optical fiber such that the light source, when lit, can direct light through the operatively associated optical fiber;
    a controller associated with the light source and adapted to receive input from a radio of the vehicle on which the tires are mounted such that the controller can control the duration, intensity and/or color of the light produced by the light source based on a characteristic of music played from the radio.

14. The tire of claim 13 wherein the characteristic of the music is the beat of the music.

15. The tire of claim 13 wherein the at least one optical fiber of the illuminable feature extends through at least a portion of the tire.

16. The tire of claim 13 wherein the illuminable feature includes a receiver to receive a signal from a controller, and a controller that allows a user to control the illuminable feature.

17. The tire of claim 13 wherein the illuminable feature includes a multiplicity of optical fibers and at least some of the optical fibers are arranged such that they create a pattern on the sidewall of the tire.

18. The tire of claim 17 wherein the pattern is selected from one or more of the following: a ring extending around at least a portion of the sidewall, a letter, a logo, a number, a graphical design, and combinations thereof.

19. The tire of claim 17 wherein two or more of the multiplicity of optical fibers are operatively associated with two or more different light sources such that the different light source, when lit, can direct light through the respective operatively associated optical fibers.

* * * * *